United States Patent
Moon et al.

(10) Patent No.: US 10,363,688 B2
(45) Date of Patent: Jul. 30, 2019

(54) DEVICE FOR FABRICATING ION EXCHANGE MEMBRANE AND METHOD OF FABRICATING THE ION EXCHANGE MEMBRANE

(71) Applicant: GWANGJU INSTITUTE OF SCIENCE AND TECHNOLOGY, Gwangju (KR)

(72) Inventors: Seung-Hyeon Moon, Gwangju (KR); Ju-Young Lee, Gwangju (KR); Jae-Hun Kim, Gwangju (KR); Ju-Hyuk Lee, Gwangju (KR)

(73) Assignee: GWANGJU INSTITUTE OF SCIENCE AND TECHNOLOGY, Gwangju (KR)

(*) Notice: Subject to any disclaimer, the term of this patent is extended or adjusted under 35 U.S.C. 154(b) by 458 days.

(21) Appl. No.: 15/096,263

(22) Filed: Apr. 11, 2016

(65) Prior Publication Data

US 2016/0375611 A1    Dec. 29, 2016

(30) Foreign Application Priority Data

Jun. 25, 2015   (KR) .......................... 10-2015-0090573

(51) Int. Cl.
 *B29C 39/42*   (2006.01)
 *B29C 39/02*   (2006.01)
 *B29C 39/00*   (2006.01)
 *H01M 8/1023*  (2016.01)
 (Continued)

(52) U.S. Cl.
 CPC ............ *B29C 39/42* (2013.01); *B29C 39/003* (2013.01); *B29C 39/02* (2013.01); *H01M 8/1023* (2013.01);
 (Continued)

(58) Field of Classification Search
 CPC ....... B29C 39/00; B29C 39/22; B29C 39/003; B29C 39/02; B29C 39/42; B29C 41/12;
 (Continued)

(56) References Cited

U.S. PATENT DOCUMENTS

2016/0089842 A1* 3/2016 Cakmak .............. B29C 71/0072
264/437

FOREIGN PATENT DOCUMENTS

| KR | 20040092332 A | 11/2004 |
| KR | 20080083805 A | 9/2008 |
| KR | 101237771 B1 | 2/2013 |

OTHER PUBLICATIONS

[Supportive Materials for Exception to Loss of Novelty] Electrically aligned ion channels in cation exchange membranes and their polarized conductivity on Jan. 5, 2015, 6 pages.
(Continued)

*Primary Examiner* — Philip C Tucker
*Assistant Examiner* — Jimmy R Smith, Jr.
(74) *Attorney, Agent, or Firm* — Hauptman Ham, LLP

(57) ABSTRACT

The present disclosure relates to a technique for improving the ionic conductivity by introducing an electric field concept to a process for preparing an ion exchange membrane and deflecting an ion channel within an ion exchange membrane in one direction, and specifically to a device for fabricating an ion exchange membrane and a method therefor in a roll-to-roll manner and a casting manner with a deflected ion channel which can improve the ionic conductivity of the ion exchange membrane by reducing a travelling distance of the ions in the deflected ion channels.

11 Claims, 16 Drawing Sheets

(51) Int. Cl.
*H01M 8/1025* (2016.01)
*H01M 8/1039* (2016.01)
*B29K 81/00* (2006.01)
*B29L 31/00* (2006.01)
*B29L 31/34* (2006.01)
*B29C 41/12* (2006.01)
*B29C 41/50* (2006.01)
*H01M 8/1018* (2016.01)

(52) U.S. Cl.
CPC ....... *H01M 8/1025* (2013.01); *H01M 8/1039* (2013.01); *B29C 41/12* (2013.01); *B29C 41/50* (2013.01); *B29K 2081/06* (2013.01); *B29L 2031/3406* (2013.01); *B29L 2031/755* (2013.01); *H01M 2008/1095* (2013.01); *H01M 2300/0082* (2013.01); *Y02P 70/56* (2015.11)

(58) Field of Classification Search
CPC ......... B29C 41/50; B29C 41/00; B29C 41/34; B29C 39/44; B29C 41/52; B29C 71/0072; B29C 71/0081
See application file for complete search history.

(56) References Cited

OTHER PUBLICATIONS

[Supportive Materials for Exception to Loss of Novelty] 2015 Spring meeting of the Korean Electrochemical Society on Apr. 2, 2015, 5 pages.

\* cited by examiner

DEVICE FOR FABRICATING ION EXCHANGE MEMBRANE AND METHOD OF FABRICATING THE ION EXCHANGE MEMBRANE

CROSS-REFERENCE TO RELATED APPLICATIONS

This application claims the priority of Korean Patent Application No. KR 10-2015-0090573 filed on Jun. 25, 2015, in the Korean Intellectual Property Office, the disclosure of which is incorporated herein by reference.

BACKGROUND

1. Technical Field

The present disclosure relates to an ion exchange membrane, and more particularly to a device for fabricating an ion exchange membrane and a method for fabricating the ion exchange membrane using an electric field.

2. Description of the Related Art

An ion exchange membrane can be classified as a cation exchange membrane selectively permeable to cations and an anion exchange membrane selectively permeable to anions. This selective permeability to ions is due to the existence of inherent ion exchangers to which each of the ion exchange membranes is attached. For example, the cation exchange membrane contains fixed anions such as sulfonic acid group ($—SO_3^-$), and the anion exchange membrane contains fixed cations such as amine group ($NH_3^+$). Such ion exchangers attract ions with the opposite charges while repel ions with the same charges, thereby allowing for selective ion exchange.

A number of ion channels with these ion exchangers attached thereto are formed inside the ion exchange membrane. Studies on the ion channels have been consistently presented using a film of Nafion™. According to the analysis, such as Electro-Spin Resonance (ESR), Small Angle X-ray Scattering (SAXS), Nuclear Magnetic Resonance (NMR), etc., aggregates of ion exchangers, also referred to as a cluster, are present in the film of Nafion™, and ion channels are extended and connected to the aggregates in various directions.

The travelling time of the ions is dependent on the length and direction of the ion channels formed in the ion exchange membrane, which results in a long distance travelling path of the ions by the ion channels extended toward various directions as mentioned above, and therefore rapid movement of the ions cannot be expected. In order to solve this problem, the ion travelling distance is intended to be drastically reduced by deflecting the ion channels to a desired direction, such that a significantly fast and efficient movement of the ions can be achieved.

RELATED PRIOR ART

Patent Document 1: Korean Laid-open Patent Publication No. 2004-0092332

Patent Document 2: Korean Laid-open Patent Publication No. 2008-0083805

Patent Document 3: Korean Patent No. 1237771

SUMMARY

One object of the present disclosure is to provide a technical concept that can be applied to any type of ion exchange membrane rather than the development of new materials, and propose a way to improve the ionic conductivity without regard to the type of ion exchangers.

Another object of the present disclosure to improve the ionic conductivity of the ion exchange membrane is to provide a device for continuously preparing an ion exchange membrane in which ion channels are aligned in one direction during the manufacturing process of the ion exchange membrane.

A still another object of the present disclosure is to provide a device for fabricating an ion exchange membrane and a method for fabricating the ion exchange membrane which can effectively align the ion channels.

To this end, there is provided a method including displacing a material comprising fixed ions between a positive electrode and a negative electrode, and aligning the fixed ions in an electric field direction, and particularly to a method including passing the material continuously through a region where the electric field is applied to continuously align the inner fixed ions, thereby capable of improving the properties of the material.

In particular, there is provided a device for continuously preparing an ion exchange membrane with improved ionic conductivity by deflecting the ion channels present in the material to minimize the travelling distance of the ions, and particularly to a device for continuously forming an ion exchange membrane by deflecting ion exchangers attached to a polymer backbone in a polymer solution in one direction to form the ion channels and maintain the same as formed.

Further, in one aspect of the present disclosure, provided is a device for fabricating an ion exchange membrane, including: a substrate on which a polymer solution is placed; a doctor blade which is arranged spaced apart from the substrate, and is in contact with the polymer solution to transfer the same to both ends of the substrate to perform a casting process; and a function generator which is electrically connected to the substrate and the doctor blade to give an AC voltage and AC frequency.

In addition, in another aspect of the present disclosure, provided is a method for fabricating an ion exchange membrane using a device for fabricating an ion exchange membrane comprising a substrate, a doctor blade, and a function generator, including: placing a polymer solution on the substrate; and forming the ion exchange membrane by performing a casting process with the polymer solution using the device, wherein an AC electric field is applied to the polymer solution while performing the casting process.

The technique of the present disclosure is applicable without regard to the polymer structure and the type of the ion exchangers.

The technique of the present disclosure can provide an ion exchange membrane with 4 to 20 fold increased ionic conductivity under the same conditions in terms of ion exchange capacity as compared to an ion exchange membrane prepared by a conventional method.

Since the present disclosure includes a further process of forming an electric field only during the manufacturing process of the ion exchange membrane, it is easily modified from the existing manufacturing process for the ion exchange membrane, and therefore is broadly applicable.

The device for fabricating an ion exchange membrane in the present disclosure allows a substrate having an impregnated polymer solution to pass through an electric field area at a constant rate, to continuously produce an ion exchange membrane having aligned ion channels, which can thus guarantee excellent productivity.

The device for fabricating an ion exchange membrane in the present disclosure allows a substrate having an impregnated polymer solution to pass through in contact with a casting rod to which a voltage is applied, such that it can be prepared at a considerably lower voltage than a non-contact alignment method of the ion channels and energy effective.

The device for fabricating an ion exchange membrane in the present disclosure can provide an easy application of AC electric field to the ion exchange membrane during the process of forming the ion exchange membrane, and accordingly improve the user's convenience and product yield.

When forming an ion exchange membrane through the method for fabricating the ion exchange membrane in the present disclosure, since the ion channels can be effectively arranged by applying an AC electric field, the ion exchange membrane with improved ion conductivity can be achieved.

BRIEF DESCRIPTION OF DRAWINGS

The above and other objects and features of the present disclosure will become apparent from the following description of the disclosure, when taken in conjunction with the accompanying drawings, in which.

BRIEF DESCRIPTIONS OF SYMBOLS

Figure 1:
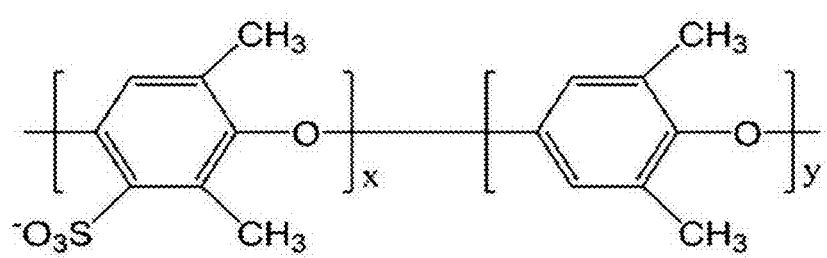
FIG. 1 shows a formula of sulfonated poly(2,6-dimethyl-1,4-phenylene oxide) (SPPO).

33: Polymer solution
100: Substrate
200: Doctor blade
300: Function generator
400: Oscilloscope

DETAILED DESCRIPTION

Hereinafter, embodiments of the present disclosure will be described in detail with reference to the accompanying drawings. It should be understood that the present disclosure is not limited to the following embodiments, and that the embodiments are provided for illustrative purposes only. The scope of the disclosure should be defined only by the appended claims and equivalents thereof.

In the drawings, thicknesses are enlarged or reduced for clarity of various layers and regions. In addition, thicknesses of some layers and regions are exaggerated for convenience of description. Like reference numerals designate like elements throughout the specification.

Device for Fabricating an Ion Exchange Membrane (1)

The present disclosure relates to a method including displacing a material comprising fixed ions between a positive electrode and a negative electrode, and aligning the fixed ions in an electric field direction, and particularly to a method including passing the material continuously through a region where the electric field is applied in order to continuously align the inner fixed ions, thereby capable of improving the properties of the material.

In particular, the present disclosure is directed to a device for continuously preparing an ion exchange membrane with improved ionic conductivity by deflecting the ion channels present in the material to minimize the travelling distance of the ions, and particularly to a device for forming an ion exchange membrane by deflecting ion exchangers attached to a polymer backbone in a polymer solution in one direction to form the ion channels and maintain the same as formed.

That is, the device for fabricating an ion exchange membrane according to one embodiment of the present disclosure may include (a1) a first motor, (a2) a second motor, (b1) a first roller, (b2) a second roller, (c) a porous substrate, (d) a polymer solution, (e1) an anode casting rod, (e2) a cathode casting rod, and (f) a power supply. Particularly, the inventive device may include (a1) a first motor 9, (a2) a second motor 10, (b1) a first roller 11 driven by the first motor, (b2) a second roller 12 driven by the second motor, (c) a porous substrate 21 which is to be rolled while moving from the first roller as rolled to the second roller, (d) a polymer solution 22 into which the porous substrate is immersed while moving from the first roller to the second roller, and (e1) an anode casting rod 8a and (e2) a cathode casting rod 8b, which are located up and down the porous substrate and capable of applying an electric field thereto after the immersion of the porous substrate into the polymer solution and before the rolling of the porous substrate around the second roller, and (f) a power supply 24 which is capable of applying an electric field to the anode casting rod and the cathode casting rod.

According to one embodiment, the device for continuously preparing an ion exchange membrane may further include at least one selected from (g) an ammeter and (h) a power supply control unit. That is, the device for continuously preparing an ion exchange membrane in accordance with an embodiment may further include at least one selected from (g) an ammeter which can measure a current supplied from the power supply, and (h) a power supply control unit which allows supplying a constant current from the power supply.

According to another embodiment, the device for continuously preparing an ion exchange membrane may further include (i) a thickness control unit. That is, the device for continuously preparing an ion exchange membrane according to another embodiment may further include a thickness control unit 20 which can adjust the gap between the anode casting rod and the cathode casting rod.

The present disclosure may include a method for continuously preparing a cation exchange membrane in which the fixed ions may include a negatively charged ion such as $SO_3^-$, $COO^-$, $PO_3^{2-}$, $HPO_2^-$, $AsO_3^{2-}$ and $SeO_3^-$, or a method for continuously preparing an anion exchange membrane in which the fixed ions may include a positively charged ion such as a primary amine group, a secondary amine group, a tertiary amine group, a quaternary ammonium group, a polyethylene imine group, and a phosphonium group.

For a device for fabricating an ion exchange membrane according to certain embodiments, materials for the anode and the cathode may be selected from a glassy carbon electrode, a graphite electrode, a silver electrode, a platinum electrode, a gold electrode, a nickel electrode, a copper electrode, or a foil. The polymers may include at least one polymer selected from a hydrocarbon polymer, a fluorinated polymer, a partially fluorinated polymer, and an aliphatic hydrocarbon-based polymer. An organic solvent available for the polymer solution may include toluene, dimethylacetamide, dimethylformamide, chloroform, methylene chloride, methanol, hexane, ethyl acetate, acetone, dimethyl sulfoxide, dimethyl formaldehyde, and the like. In addition, examples of the porous substrate may include, but are not limited to, polyethylene, polytetrafluoroethylene, polypropylene, polyvinylidene fluoride, and the like.

According to another embodiment, the polymer solution is a solution in which a sulfonated poly(2,6-dimethyl-1,4-phenylene oxide) polyester having an ion exchange capacity of from 1 to 3 meq/g is dissolved.

The ion exchange membrane continuously prepared in the present disclosure should have uniform physical properties (i.e., physical property uniformity in a longitudinal direction) independent of the time at which it is manufactured. It has been found that the physical property uniformity in a longitudinal direction can be significantly improved by precisely adjusting the ranges of the ion exchange capacity of the polymer dissolved in the polymer solution. That is, outside the above numerical range, the ion exchange membrane prepared using the device of the present disclosure may have significantly increased proton conductivity along the longitudinal direction, which results in turn significantly reduced physical property uniformity in the longitudinal direction. This is mainly because the ion exchangers are not evenly distributed in the longitudinal direction and aggregated in part. In order to prevent this aggregation of the ion exchangers and increase the uniformity of the proton conductivity in the longitudinal direction, it is important to use a polymer solution in which a sulfonated poly(2,6-dimethyl-1,4-phenylene oxide) having an ion exchange capacity of from 1 to 3 meq/g is dissolved.

According to another embodiment, the polymer solution has a ratio (w/v/v) of sulfonated poly(2,6-dimethyl-1,4-phenylene oxide)/dimethyl acetate/methanol of 1:1.5-2.5:1-2. The ion exchange membrane continuously prepared in the present disclosure should have a uniform physical property also in a width direction. It has been found that the physical property uniformity in the width direction can be significantly improved by precisely adjusting the solvent type and the amount of the polymer solution. That is, in the case where the polymer used has an ion exchange capacity of 1 to 3 meq/g of sulfonated poly(2,6-dimethyl-1,4-phenylene oxide), if a solvent other than a mixed solvent of dimethyl acetate and methanol is used, or if the ratio value is out of the above range, the uniformity of the physical property in the width direction for the ion exchange membrane continuously prepared may be significantly degraded.

According to another embodiment, (i) the porous substrate is moved at from 0.005 to 0.015 cm/sec, (ii) the porous substrate has a thickness of 12 to 38 μm, and (iii) the thickness which is kept constant by the thickness control unit may be 14 to 40 μm. It may be important that the sulfonated polymer according to the present disclosure is fully impregnated into the porous substrate (pore-filling). If it is not sufficiently impregnated thereinto, the sulfonated polymer is separated from the porous substrate during operation, causing overall performance degradation. In order to prevent such separation and ensure sufficient impregnation, the running speed of the porous substrate and the thickness of the porous substrate and its surface and the sulfonated polymer impregnated into the pores are important. That is, if the running speed of the porous substrate is out of the above numerical range, or if the thickness of the porous substrate is out of the above numerical range, or if the overall thickness of the porous substrate and its surface and the sulfonated polymer impregnated into the pores are out of the above numerical range, sufficient impregnation cannot be done, thereby yielding a significantly degraded durability of the ion exchange membrane.

Device for Fabricating an Ion Exchange Membrane (2)

Another embodiment of the present disclosure provides a device for fabricating an ion exchange membrane, including: a substrate on which a polymer solution is placed; a doctor blade which is arranged spaced apart from the substrate, and is in contact with the polymer solution to transfer the same to both ends of the substrate to perform a casting process; and a function generator which is electrically connected to the substrate and the doctor blade to give an AC voltage and AC frequency.

Figure 9:
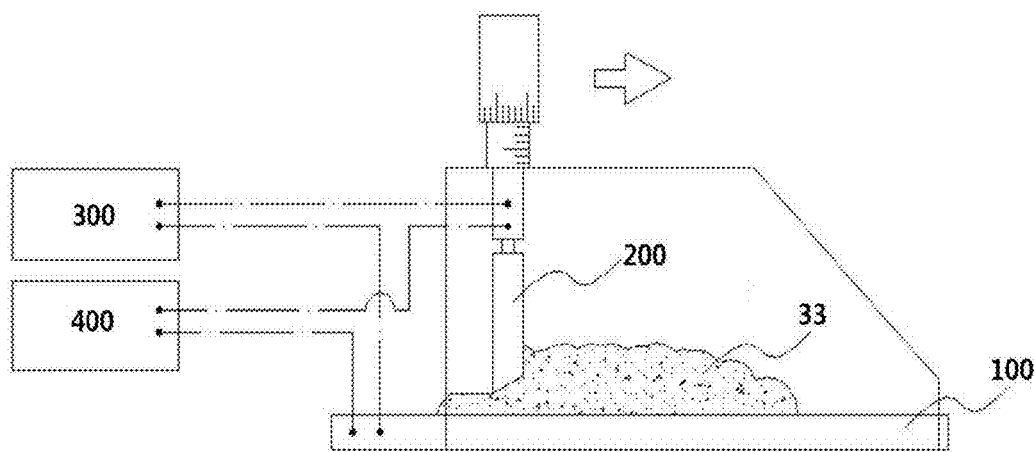
FIG. 9 is a schematic view showing a device for fabricating an ion exchange membrane according to another embodiment of the disclosure.

FIG. 9 is a schematic view showing a device for fabricating an ion exchange membrane according to another embodiment of the disclosure. Referring to FIG. 9, a substrate 100 may be placed on a lower portion of the device. The substrate 100 may be a support plate on which a polymer solution 33 is placed and formed into a film-like membrane. In addition, the substrate 100 may function as an electrode to which a current may be supplied and voltage and frequency are given by a function generator 300, which will be described later, to thereby forming an alternating electric field. Thus, the substrate 100 may be formed of a material to which the voltage and frequency may be applied to form the alternating electric field. Specifically, the substrate 100 may be formed of at least one material selected from stainless steel, aluminum (Al), iron (Fe), brass, and copper (Cu).

Referring further to FIG. 9, a doctor blade 200 can be arranged spaced apart from the substrate 100. The doctor blade 200 may be positioned in contact with the polymer solution 33 disposed on the substrate 100. It may be intended to apply an alternating electric field to the polymer solution 33, while performing a casting process for fabricating an ion exchange membrane. The doctor blade 200 may have a structure which can transfer the polymer solution 33 to both ends of the substrate 100. In other words, the doctor blade 200 may be configured to be in contact with the polymer solution 33 such that the polymer solution 33 is transferred from one end to the other end of the substrate 100 to cast the polymer solution 33 to a predetermined thickness. The doctor blade 200 may be used without particular limitation as long as it has been used as a conventional doctor blade.

According to one embodiment, the doctor blade 200 may transfer the polymer solution 33 at a rate of 5 to 7 mm/min toward one of both ends of the substrate 100. If the transfer rate of the doctor blade is out of the above range, it may be difficult to form an ion exchange membrane having a uniform thickness. According to certain embodiments, the doctor blade 200 may further include a thickness control unit (not shown) for controlling the distance from the substrate 100 so as to adjust the thickness of the polymer solution 33 to be cast.

The doctor blade 200, as the substrate 100, may also function as an electrode to which a current may be supplied and the voltage and frequency are given by a function generator 300 to thereby forming an alternating electric field. Thus, the doctor blade 200 may be formed of a material to which the voltage and frequency may be applied to form the alternating electric field. Specifically, the doctor blade 200 may be formed of at least one material selected from stainless steel, aluminum (Al), iron (Fe), brass, and copper (Cu).

As shown in FIG. 9, the device for fabricating an ion exchange membrane may include a function generator 300 which is electrically connected to the substrate 100 and the doctor blade 200 to give an AC voltage to the substrate 100 and the doctor blade 200. That is, the function generator 300 can provide AC voltage and AC frequency to the substrate 100 and the doctor blade 200 in contact with the polymer solution 33 respectively that may act as a cathode and an anode for applying an alternating electric field to the polymer solution 33.

The device for fabricating an ion exchange membrane may further include an oscilloscope 400 connected to the substrate 100 and the doctor blade 200 for measuring a frequency of voltage applied to the substrate 100 and the doctor blade 200. In general, the oscilloscope is a device capable of measuring the change in voltage at a specific time interval (band). The device for fabricating an ion exchange membrane according to the present disclosure can control an optimum range of the AC frequency applied for the alignment of the ion channels in the ion exchange membrane through the oscilloscope 400. The oscilloscope 400 may be used without particular limitation as long as it has been used as a conventional oscilloscope system.

As described above, the device for fabricating an ion exchange membrane according to another embodiment of the present disclosure can provide AC voltage and AC frequency to the substrate 100 and the doctor blade 200, while the polymer solution 33 is under casting. At this time, the alternating electric field may be applied to the polymer solution 33, while the polymer solution 33 is under casting. Therefore, when the ion exchange membrane is fabricated using the device for fabricating the ion exchange membrane according to the present disclosure, the ionic conductivity of the ion exchange membrane can be improved by forming the ion channels included in the ion exchange membrane in an ordered structure thereof.

Method for Fabricating an Ion Exchange Membrane

Another aspect of the present disclosure can provide a method for fabricating an ion exchange membrane. Specifically, provided is a method for fabricating an ion exchange membrane using a device for fabricating an ion exchange membrane comprising a substrate, a doctor blade, and a function generator, the method including: 1) placing a polymer solution on the substrate; and 2) forming the ion exchange membrane by performing a casting process with the polymer solution using the device, wherein an AC electric field is applied to the polymer solution while performing the casting process.

The foregoing descriptions on the device for fabricating an ion exchange membrane may be incorporated in the device comprising a substrate, a doctor blade and a function generator.

Specifically, step 1) in the method for fabricating an ion exchange membrane of the present disclosure may include placing a polymer solution on the substrate included in the device for fabricating the ion exchange membrane.

The polymer solution as a material for forming an ion exchange membrane may be a polymer solution obtained by dissolving an ion conductive polymer in an organic solvent. Specifically, the polymer solution may include a solvent and at least any one ion conductive polymer selected from a hydrocarbon-based polymer, a fluorine-based polymer, a partially fluorine-based polymer, and an aliphatic hydrocarbon-based polymer. Specifically, the organic solvent may include, but is not limited to, at least one selected from, for example, toluene, dimethylacetamide, dimethylformamide, chloroform, methylene chloride, methanol, hexane, ethyl acetate, acetone, dimethyl sulfoxide, and dimethyl formaldehyde.

According to certain embodiments, the polymer solution may include a sulfonated poly(2,6-dimethyl-1,4-phenylene oxide) (SPPO) and a solvent. The sulfonated poly(2,6-dimethyl-1,4-phenylene oxide) (SPPO) has a substituted sulfonic acid group ($-SO_3^-$) at 3 or 5 on the benzene ring (atomic ring), and is characterized by that since the sulfonic acid group is only an ion conductive side chain connected to the backbone, its length is shorter than that of the side chain of Nafion film which is a commercially available cation exchange membrane. According to certain embodiments, the sulfonated poly(2,6-dimethyl-1,4-phenylene oxide) (SPPO) may have an ion exchange capacity of from 1 to 2 meq/g, but is not limited thereto.

Step 2) in the method for fabricating an ion exchange membrane according to the present disclosure may include forming the ion exchange membrane by performing a casting process with the polymer solution using the device. More specifically, the doctor blade in the device is in contact with the polymer solution disposed on the substrate and can transfer the polymer solution to either end of the substrate. With this, it is allowed to easily cast the polymer solution on the substrate. Specifically, the casting process may include applying the polymer solution on the substrate in a film shape having a predetermined thickness, followed by heat treating the polymer solution applied on the substrate at a temperature of 60 to 70° C. to evaporate the solvent contained in the polymer solution such that a film type of ion exchange membrane is formed while drying the polymer solution. In this embodiment, an alternating electric field may be applied to the polymer solution while performing the casting process for forming the ion exchange membrane.

Specifically, while casting the polymer solution using the doctor blade, the AC voltage and AC frequency may be given to the substrate and the doctor blade via the function generator included in the device for fabricating an ion exchange membrane such that the alternating electric field may be applied to the polymer solution in contact with the substrate and the doctor blade.

Specifically, in the step of forming the ion exchange membrane, 1 to 2 V of alternating voltage may be given to the substrate and the doctor blade. Further, in the step of forming the ion exchange membrane, 10 to $10^5$ Hz of AC frequency may be given to the substrate and the doctor blade. Within these ranges of AC voltage and AC frequency, the alignment of the ion channels in the ion exchange membrane can be optimized. Specifically, this will be described through the following examples and drawings.

According to certain embodiments, in the case of the ion conductive polymer SPPO used as the polymer solution, a friction force gets stronger due to a sterically hindered complex structure of an aromatic main chain and a short side chain and thereby an easy alignment may not be achieved, but the applying of an alternating electric field to the ion conductive polymer can impart a flexibility to the ion conductive side chain such that the alignment of the ion channels can be smoothly made. The ion exchange membrane having the aligned structure of the ion channels may have the effects of improving the ionic conductivity while reducing the moving distance of the ions in accordance with the deflection of the ion channels.

As described above, when applying an alternating electric field to the ion conductive polymer constituting an ion exchange membrane, a short ion conductive side chain vibrates along the axis of the electric filed to form a free space, causing thereto a flexible movement to thereby implement a much higher alignment degree of the ion channels. Thus, the ion exchange membrane can have the aligned ion channel structure by the applied AC electric field.

Hereinafter, the present disclosure will be described in more detail with reference to some examples. It should be understood that the following examples are provided for illustrative purposes only and are not to be in any way construed as limiting the present disclosure.

EXAMPLES

Preparation Example 1: Synthesis of Polymer and Preparation of Polymer Solution

Sulfonated poly(2,6-dimethyl-1,4-phenylene oxide) (SPPO) (ion exchange capacity: 2.5 meq/g) was synthesized through the following process. 20 g of PPO was dissolved in 200 mL of chloroform, and then 3.5 mL of chlorosulfonic acid was slowly injected to sulfonate the PPO to obtain the SPPO as shown in FIG. 1. 4 g of the harvested SPPO and 16 mL of dimethyl acetamide were stirred to yield the polymer solution.

Preparation Example 2: Alignment of Ion Channels

Figure 2A:
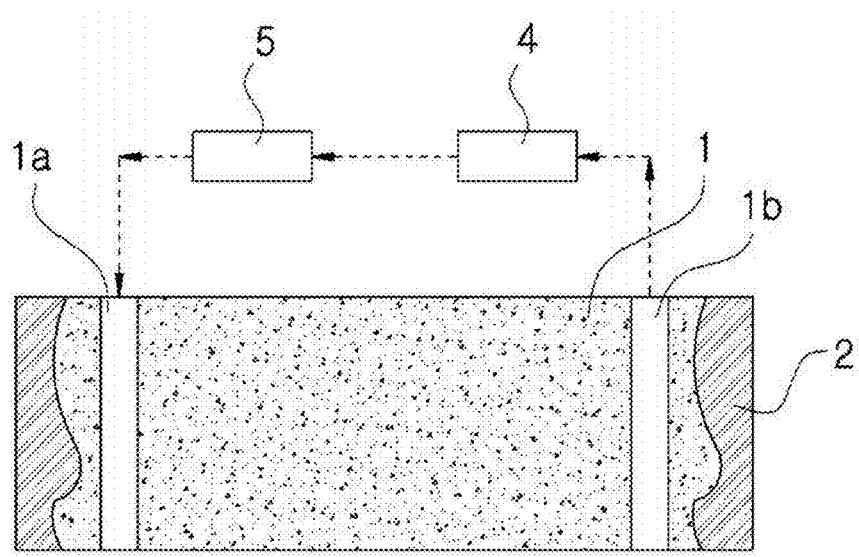
FIG. 2A shows a schematic plan view of a device for aligning ion channels in a plane direction of an ion exchange membrane using an electric field.
Figure 2B:
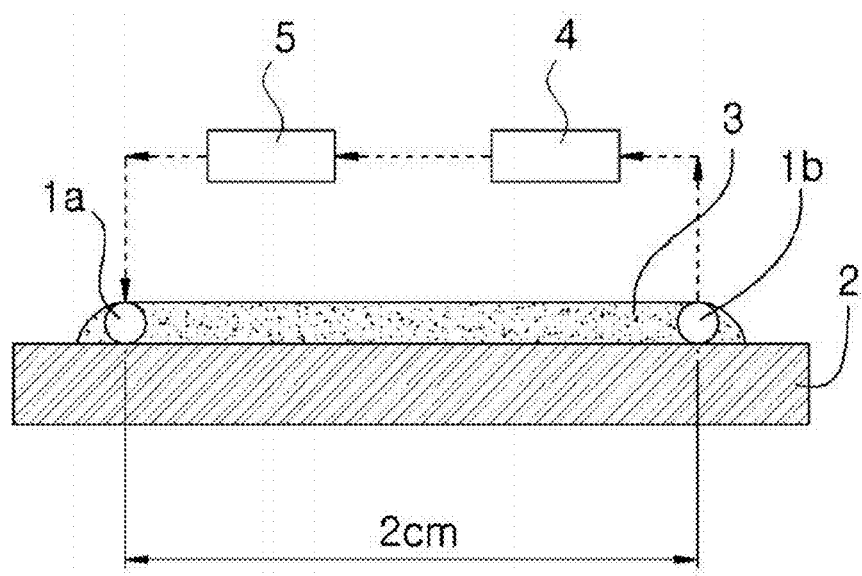
FIG. 2B shows a schematic side view of a device for aligning ion channels in a plane direction of an ion exchange membrane using an electric field.

The following experiment was carried out to align the ion channels using an electric field, and the ion channels were aligned in a surface direction to facilitate the analysis of the ion channels. As shown in FIG. 2A and FIG. 2B, platinum wires 1a and 1b were fixed with a distance of 2 cm on the glass plate 2. A power supply 5 for supplying a voltage and a pico-ammeter 4 for measuring the current flow as the electric field is formed 4 were connected in series. The polymer solution 3 prepared as above was cast over the two platinum wires 1a and 1b, and 50 V of voltage was applied to the two platinum wires 1a and 1b to form an electric field. Ion exchangers were allowed to stand for one hour while the electric field is formed to respond to the field. At the same time, the current was measured to observe a phenomenon that occurs in the polymer solution. After one hour, the applied voltage was removed, and the polymer solution was allowed to stand for additional two hours under the same conditions to remove the solvent completely. The prepared ion exchange membrane was soaked in 0.1 N of sulfuric acid solution for 6 hours for acid rinsing. Then, the remaining acid on the surface of the ion exchange membrane was rinsed with distilled water, and then soaked and stored in fresh distilled water.

Comparative Preparation Example 1: Preparation of Ion Exchange Membrane for Control The polymer solution 3 prepared in Preparation Example 1 above was cast on a glass plate 2, and held on a heater at 60° C. for three hours to dry the solvent completely. The prepared ion exchange membrane was soaked in 0.1 N of sulfuric acid solution for 6 hours for acid rinsing. Then, the remaining acid on the surface of the ion exchange membrane was rinsed with distilled water, and then soaked and stored in fresh distilled water.

Test Example 1: Measurement of Current

Figure 3:
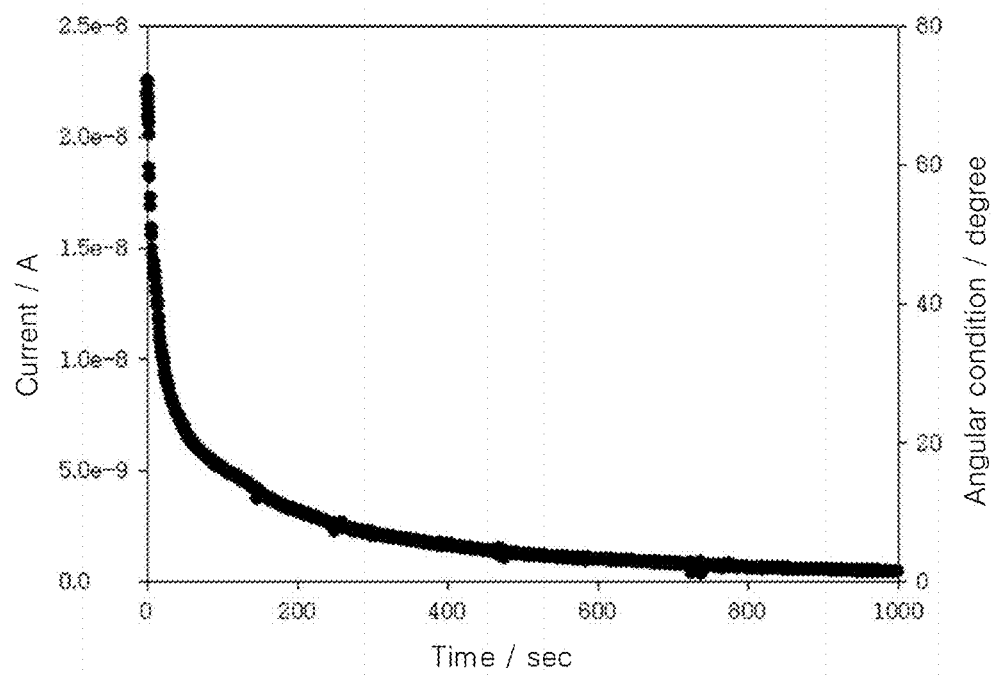
FIG. 3 shows the current changes and dipole angle observed during the application of electric field.

Current change means that the movement of the electric charge is generated in the polymer solution. Therefore, it is possible to check a reaction degree and an alignment of the ion exchangers by measuring the current in response to an electric field. As shown in FIG. 3, it was confirmed that the current converged to 0 ampere over time. This means that the movement of the electric charge took place actively at an early stage when the electric field was applied and it had gradually stopped over time.

When viewed from the perspective of the theory that the dipole is rotated by an external electric field, the dominant cause of the current shown in FIG. 3 is the rotation of the dipole. Relationship between the current and the dipole alignment can also be interpreted numerically. The external electric field is forced to rotate the dipole to generate a rotational energy, and the energy can be expressed in combination with an electrical energy by the following equation.

$$I=\sqrt{nEqd(1-\cos\theta)/R} \quad (1)$$

where I denotes a current (A), n denotes the number of molecules, E denotes an external electric field (V/m), q denotes a charge (C), d denotes is a distance (m) between two dipole particles, θ is an angle (°) of the dipole and the electric field, and R denotes a resistance (Ω) of membrane, respectively. In the equation above, since all but the angle of dipole and the electric field (hereinafter, "dipole angle") are constant values, the current changes can be represented by the changes in the dipole angle. When calculated in connection with the current and the dipole angle observed in FIG. 3, it can be found that initially the average angle of all of the dipoles gradually decreased from about 73.2° to 0°. That is, it can be found that all the dipoles were aligned due to the influence of the electric field.

Test Example 2: Measurement of Proton Conductivity in Surface Direction

Figure 4:
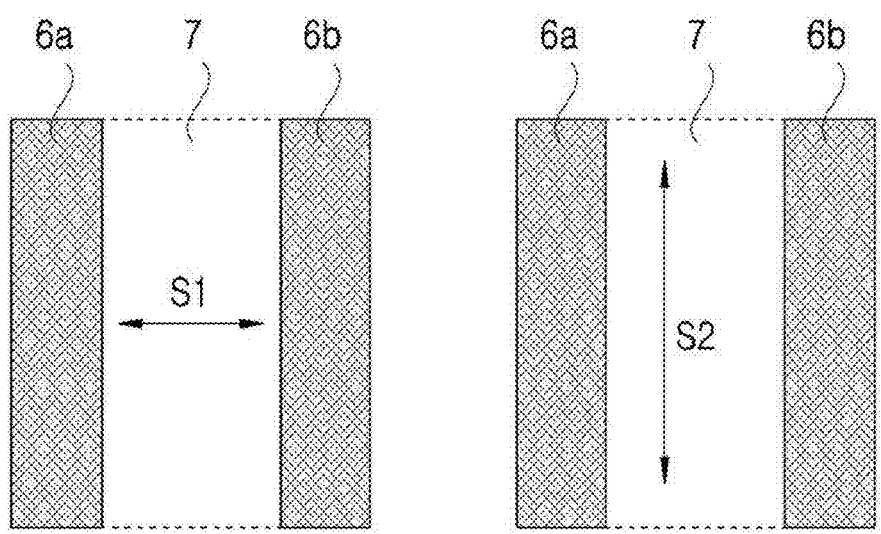
FIG. 4 respectively shows that if the measurement direction of deflected ion exchange membrane resistance is direction S1, the deflected direction of predicted ion channels is perpendicular to the direction of measuring electrodes, and if direction S2, then the deflected direction of predicted ion channels is parallel to the direction of measuring electrodes.

In order to confirm the alignment of the ion channels, the resistance of the ion exchange membrane was measured in a biased direction, and the proton conductivity was calculated by the result. As suggested in FIG. 4, it was measured based on where the deflected direction of the ion channels is perpendicular or parallel to the direction of the measuring electrodes. The resistance of the ion exchange membrane was measured using an impedance meter (AutoLab, PGSTAT30) with four-electrode system. The proton conductivity was calculated from the measured resistances by the following equation, and the results are given in Table 1.

$$\sigma = \frac{L}{R \cdot w \cdot d} \quad (2)$$

where σ denotes a proton conductivity (S/cm), R denotes a resistance (Ω) of the ion exchange membrane, w denotes a width (cm) of the ion exchange membrane, d denotes a thickness (cm) of the ion exchange membrane, and L denotes a distance (cm) between the measuring electrodes.

TABLE 1

|  | Direction S1 | Direction S2 |
| --- | --- | --- |
| Conventional ion exchange membrane | 8.0 mS/cm | 7.1 mS/cm |
| Ion exchange membrane with aligned ion channels | 22.0 mS/cm | 4.8 mS/cm |

The proton conductivity in a surface direction was compared using the ion exchange membrane with aligned ion channels prepared in Preparation Example 2 and the conventional ion exchange membrane prepared in Comparative Preparation Example 1. The proton conductivities measured for the conventional ion exchange membrane show very similar results in directions S1 and S2, which indirectly demonstrate that the ion channels were extended in various directions while they are not deflected conditions. Meanwhile, the ion exchange membrane with aligned ion channels shows a proton conductivity of 22.0 mS/cm in direction S1, and 4.8 mS/cm in direction S2. Such a big difference depending on the direction of measurement suggests that the ion channels were deflected.

As in direction S1, when the deflected direction of the predicted ion channels is arranged perpendicular to the direction of the measuring electrodes, since the ion channels connect the two measuring electrodes, the protons can naturally flow from one measuring electrode through the ion channels to the opposite measuring electrode, thereby capable of obtaining higher proton conductivity. On the contrary, as in direction S2, when the deflected direction of the predicted ion channels is arranged parallel to the direction of the measuring electrodes, the ion channels do not cover the two measuring electrodes at the same time. In this case, since the protons flowing at one measuring electrode fail to have straightforward flow passages (ion channels) for moving toward the opposite measuring electrode, higher resistance of the ion exchange membrane is noted and lower proton conductivities are reported compared with direction S1. Therefore, the results demonstrate that the ion channels can be arranged by an electric field, which further means that the ion channels can be arranged in any desired direction according to the present disclosure.

Test Example 3: AFM Analysis

Atomic Force Microscopy (AFM) can analyze the surface of the ion exchange membrane to distinguish between the hydrophilic and hydrophobic properties. Since the ion channels contain water molecules, they show a hydrophilic nature, and the hydrocarbon and benzene-based backbones of the polymers used in the preparation of the ion exchange membrane show a hydrophobic nature. This test example was carried out using AFM (XE-100, Park System) equipped with a non-contact mode tip (PPP-NCHR, Nanosensors), and the conventional ion exchange membrane prepared in Comparative Preparation Example 1 and the ion exchange membrane with aligned ion channels prepared in Preparation Example 2 were analyzed for their surface to compare the shape of the ion channels.

Figure 5A:
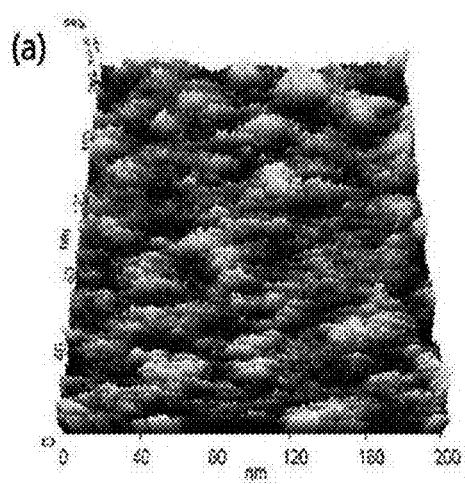
FIG. 5A shows an AFM image of the conventional ion exchange membranes.
Figure 5B:
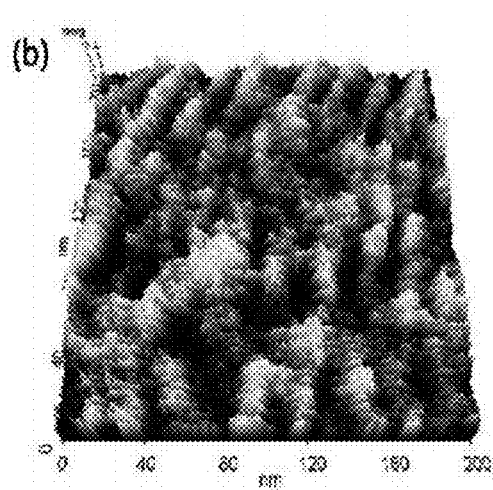
FIG. 5B shows an AFM image of the ion exchange membranes in which ion channels are aligned.

The image of the conventional ion exchange membrane shown in FIG. 5A suggests that since the aggregates of the ion exchange membrane (cluster) are dispersed in any locations and fail to form a prominent cylindrical shape of ion channels, the ion channels could be connected with the clusters below the surface and extended in various directions. On the contrary, FIG. 5B shows that the ion channels having a diameter of 15 to 18 nm form a cylindrical shape and extend in one direction. This image demonstrates that the ion channels are deflected under electric field.

Test Example 4: TEM Analysis

The shape of the ion channels in the ion exchange membrane was analyzed through a transmission electron microscope (TEM). Since the TEM analysis was carried out so that the electrons passed through the ion exchange membrane for analysis, the ion channels extended inside the ion exchange membrane could be profiled. In order to maximize the color contrast of the image, the ion channels were dyed with Pb ions using 1 M $Pb(NO_3)_2$ solution, and then subjected to TEM analysis. The TEM analysis was carried out using a field emission transmission electron microscope (FE-TEM, JEM-2100F, JEOL) and a transmission electron microscopy (TEM, JEM-2100, JEOL). The difference between the FE-TEM and TEM may be a resolution due to the difference in the filament used in the analysis. In order to compare the shape of the ion channels, the ion exchange membrane with aligned ion channels and the conventional ion exchange membrane were analyzed for the comparison thereof.

Figure 6A:
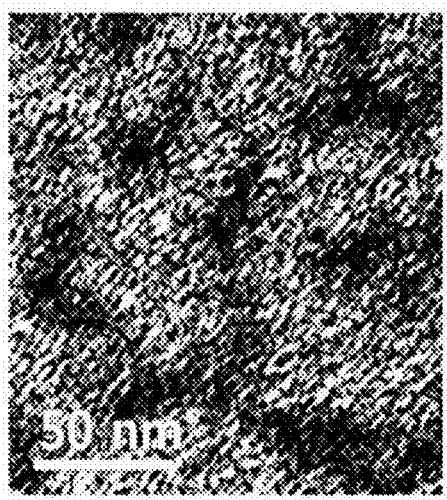
FIG. 6A shows a FE-TEM image of the conventional ion exchange membranes.
Figure 6B:
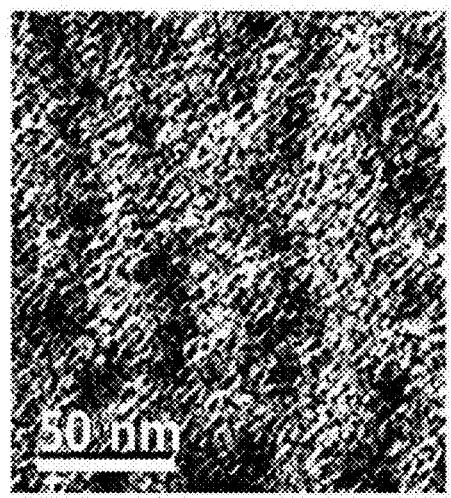
FIG. 6B shows a FE-TEM image of the ion exchange membranes in which ion channels are aligned.

The dark areas in the FE-TEM image are the ion channels having dyed Pb ions. Relatively light areas are the backbone parts of the polymer used in the preparation of the ion exchange membrane. In FIG. 6A for a conventional ion exchange membrane, ion channels are extended in various directions. On the contrary, in FIG. 6B for the ion exchange membrane with aligned ion channels, ion channels are deflected and extended in one direction. The diameter of one ion channel is 18.6 to 21.1 nm, which was similar to the diameter of the ion channel observed in the AFM.

Figure 7A:
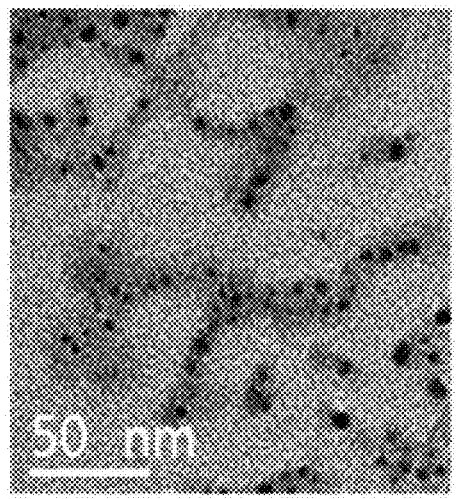
FIG. 7A shows a TEM image of the conventional ion exchange membranes.
Figure 7B:
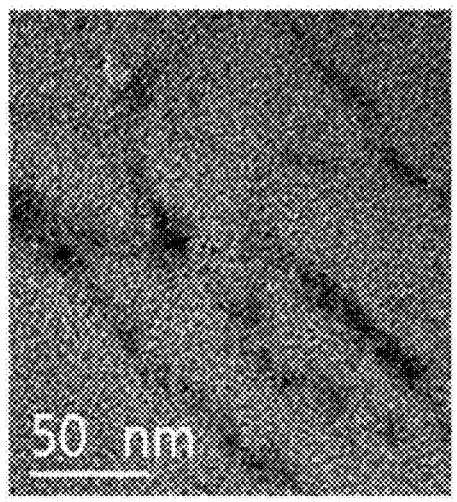
FIG. 7B shows a TEM image of the ion exchange membranes in which ion channels are aligned.

In the TEM images shown in FIG. 7A and FIG. 7B, more reliable shapes of Pb particles can be seen. The shapes are very similar to those in the FE-TEM images of FIG. 6A and FIG. 6B. For the conventional ion exchange membrane, ion channels are extended in non-uniform directions, while for the ion exchange membrane with aligned ion channels, the ion channels are extended in one direction. Therefore, these results demonstrate that the ion channels within the ion exchange membrane can be aligned by an electric field formed at the time of preparing the membrane.

Example 1: Device for Fabricating an Ion Exchange Membrane for the Alignment of Ion Channels in Thickness Direction In order to apply to an electrochemical-based energy storage system, an energy generating system and a water treatment system, the ion channels of the ion exchange membrane should be arranged in a thickness direction. As confirmed from the above results in Test Example 2, since the ion channels are deflected depending on the direction of an electric field, it is necessary to form the electric field in the thickness direction in order for the ion channels to be aligned in the thickness direction.

Figure 8A:
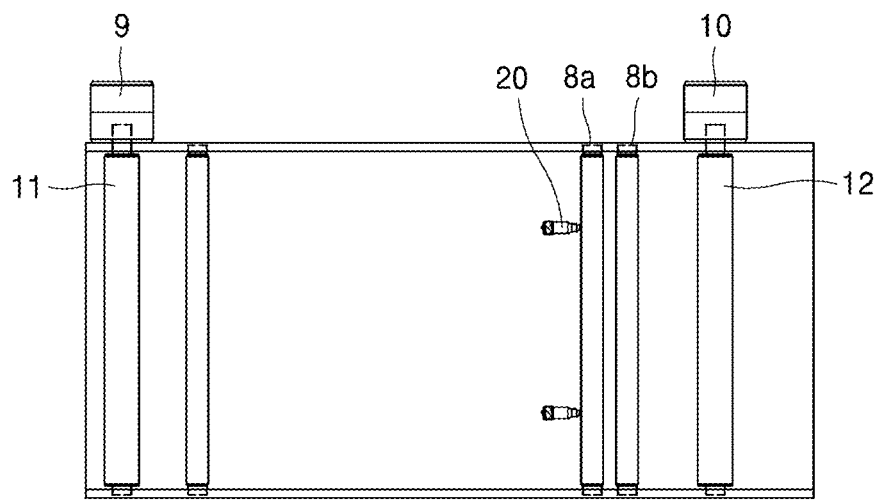
FIG. 8A shows top view of the continuously preparing device for aligning ion channels in a thickness direction.
Figure 8B:
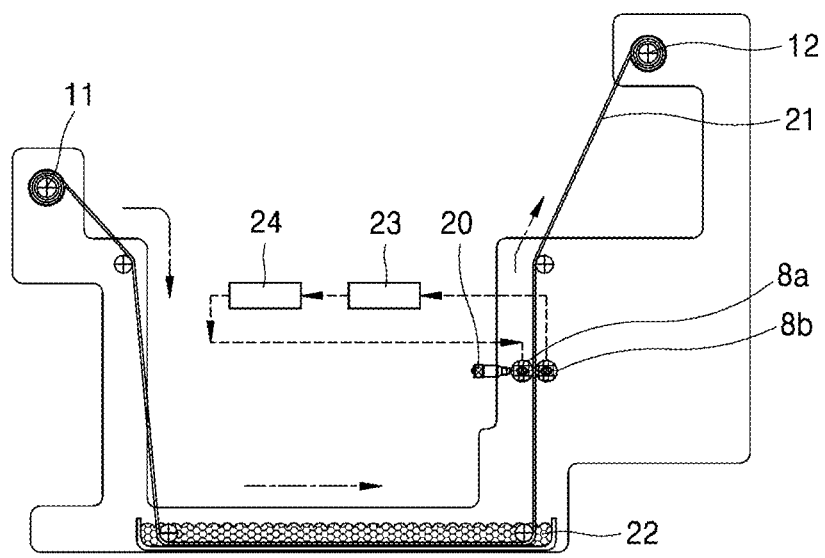
FIG. 8B shows side view of the continuously preparing device for aligning ion channels in a thickness direction.

The device for continuously preparing the ion channels according to an embodiment of the present disclosure is a continuously preparing device in a roll-to-roll manner, as shown in FIG. 8A and FIG. 8B. The device was designed based on pore-filling technique where a porous substrate is immersed in a polymer solution to fill the substrate pores with the polymer. For example, porous substrate 21 of polyethylene (PE) was wound around the left roller 11, and then moved to the right at a constant rate of 0.01 cm/sec. The movement was regulated by each of circular motors 9 and 10 equipped in the left roller 11 and the right roller 12. While moving, the porous substrate 21 was immersed in the polymer solution 22 prepared in Test Example 1 to which methanol was added (SPPO:DMAc:MeOH=1:2:1.6 (w/v/v)), and the polymer solution filled the pores in the substrate.

After completing the filling, the ion exchange membrane moved to the right roller 12, while the ion exchange membrane was transferred between the anode casting rod 8a and the cathode casting rod 8b having received a voltage supplied from power supply unit 24. Ion exchangers in the polymer solution were aligned in the thickness direction by the electric field generated by the two roller bar. The spacing between the casting rods 8a and 8b was controlled to adjust the thickness of the membrane at a constant membrane thickness by thickness control unit 20. The alignment and short circuit of the ion channels were checked in real time by monitoring the current through ammeter 23.

In order to confirm the alignment degree of the ion channels according to the strength of the electric field, the ion exchange membranes were prepared under the conditions of 0.4 V, 0.8 V, 1.2 V, and 1.6 V, respectively, while conventional ion exchange membrane for control group was additionally prepared without applying the electric field.

Test Example 5: Measurement of Proton Conductivity in Thickness Direction

The proton conductivity was measured to confirm the alignment degree of the ion channel. The ion channels were aligned in the thickness direction of the ion exchange membrane. The proton conductivity was measured using a resistance measurement system in thickness direction disclosed in Korean Patent No. 1237771. The resistance of the ion exchange membrane was measured using impedance meter (AutoLab, PGSTAT30). The proton conductivity was calculated from the measured resistance by the following equation, and the results are presented in Table 2 below.

$$\sigma = \frac{d}{R \cdot A} \quad (3)$$

where σ denotes a proton conductivity (S/cm), R denotes a resistance of ion exchange membrane (Ω), A denotes an area of ion exchange membrane ($cm^2$), and d denotes a thickness (cm) of ion exchange membrane, respectively.

TABLE 2

| | Potential (V) | | | | |
|---|---|---|---|---|---|
| | 0 | 0.4 | 0.8 | 1.2 | 1.6 |
| Proton conductivity (mS/cm) | 4.2 | 14.5 | 18.9 | 7.8 | 4.6 |

Generally, the ion exchange membranes prepared under the electric field show higher proton conductivities than the ion exchange membrane prepared without the electric field. These results demonstrate that the ion channels were deflected depending on the generation of the electric field, and the proton conductivities were enhanced. Particularly, the greatest difference in the proton conductivity of the ion exchange membrane was shown between the ion exchange membrane prepared under the condition of 0.8 V, and the conventional ion exchange membrane.

The values of the proton conductivities varied in accordance with the applied voltage, which means that the alignment degree of the ion channels depends on the strength of the applied electric field. We could find that the proton conductivity in accordance with the strength of the voltage was increased up to 0.8 V, but it was rather decreased after 1.2 V. It is believed that although since the electric field increases as the applied voltage increases, the ion channels can be accordingly aligned more quickly and efficiently, if an excessive voltage is applied, the main chain of the polymer or the dipole type intended to be aligned may be disrupted to cause the degradation of the polymer, which eventually leads to irregular shape changes.

Consequently, it could be found that the ion exchange membrane prepared under the proper voltage conditions has about 4 to 5 times higher ionic conductivity than a normal ion exchange membrane. Accordingly, the application of the inventive ion exchange membrane to an electrochemical-based energy storage system, an energy generating system, and a water treatment system is expected to give an improved efficiency.

Example 2: Device for Fabricating an Ion Exchange Membrane Using Alternating Electric Field 5 mL of the polymer solution prepared in Example 1 was dropped on a stainless steel substrate, and cast at a speed of 5 mm/min from the height of 300 μm with a doctor blade made of stainless steel to form a polymer film. While casting, a sinusoidal AC voltage of a positive potential and a negative potential each having voltage range of 2 V was applied using a function generator, and while observing the shape of the AC voltage by further connecting an oscilloscope, AC frequencies of 10 Hz, 100 Hz, 300 Hz, 500 Hz, 1 kHz, 10 kHz, and 100 kHz per samples were applied. After the cast was completed, the ion exchange membrane as prepared was dried for about 3 hours on a hot plate set at 60° C.

Comparative Example 1: Preparation of Ion Exchange Membrane without Applying an Electric Field The ion exchange membrane was prepared by performing the same procedures as Example 1, except that no electric field was applied during the casting process.

Comparative Example 2: Preparation of Ion Exchange Membrane by Applying a DC Electric Field The ion exchange membrane was prepared by performing the same procedures as Example 1, except that DC electric field was applied at 1 V, 2 V, 3 V, 4 V, and 5 V per samples during the casting process.

Test Example 6: Measurement of Proton Conductivity in Thickness Direction of Ion Exchange Membrane The proton conductivity was measured to confirm the alignment degree of the ion channel in the ion exchange membrane. The ion channels were aligned in the thickness direction of the ion exchange membrane. The proton conductivity was measured using a resistance measurement system in thickness direction disclosed in Korean Patent No. 1237771. The resistance of the ion exchange membrane was measured using impedance meter (AutoLab, PGSTAT30). The proton conductivity in the ion exchange membrane was calculated from the measured resistance by the above equation 3.

The results of the proton conductivity for the ion exchange membrane prepared in Comparative Examples 1 and 2 are summarized in Table 3 below.

TABLE 3

| | Applied voltage (V) | | | |
|---|---|---|---|---|
| | 0 | 1 | 2 | 3 |
| Proton conductivity (mS/cm) | 9.0 | 20.8 | 109.1 | 46.2 |

From the ion exchange membranes prepared by applying a voltage of 4 V and 5 V, respectively, in Comparative Example 2, air bubbles were generated by the electrochemical reaction during the manufacturing process. It was estimated that some of the polymers constituting the polymer solution was degraded, and therefore they were excluded from the measuring target.

Referring to Table 3, it can be seen that the proton conductivity significantly increased with the intensity of the voltage increasing from 1 V to 2 V, while the proton conductivity at 3 V decreased. The proton conductivity varied in accordance with the applied voltage, which means that the alignment degree of the ion channels may vary depending on the intensity level of the electric field as formed.

It can be seen from this result that if a higher voltage is applied, the electric filed is formed stronger such that the ion channels may be aligned more quickly and efficiently, while if an excessive voltage is applied, the main chain or the ion exchanger constituting the ion exchange membrane may be degraded such that an inner deformation may be caused.

That is, with the results of the measurement of the proton conductivity by applying a voltage as in Comparative Example 2, since the ion exchange membrane prepared under the condition of 2 V has a high proton conductivity, the voltages in the range of 1 to 2 V in the manufacture of the ion exchange membrane were determined as an optimum voltage range that can effectively align the ion channels.

Table 4 is a proton conductivity measurement of the ion exchange membrane prepared in Example 2. AC voltage applied as the frequencies were measured was 2 V.

TABLE 4

| Applied AC frequency (Hz) | Proton conductivity (mS/cm) |
|---|---|
| 10 | 11.1 |
| 100 | 25.3 |
| 300 | 99.4 |
| 500 | 139.6 |
| 1000 | 207.3 |
| 10000 | 193.1 |
| 100000 | 84.3 |

Referring to Table 4, the proton conductivity showed a tendency to increase steadily from 10 Hz to 10 kHz. In other words, it can be seen that as the AC frequency becomes high, the vibration of the ion exchanger increases, the alignment rate of the ion channels become faster and the completeness of the alignment can be improved. However, we have confirmed that too high conditions of AC frequencies (e.g., 100 kHz or more) show rather decreased proton conductivities, and thus appropriate conditions of AC frequencies should be specified. In addition, we have confirmed that the optimal AC frequency from the above-mentioned proton conductivities results may be specified as 1 kHz, and the AC frequency condition of 1 to 10 kHz is suitable for effectively aligning the ion channels in the manufacture of the ion exchange membrane through the method for fabricating an ion exchange membrane according to the present disclosure.

Figure 10:
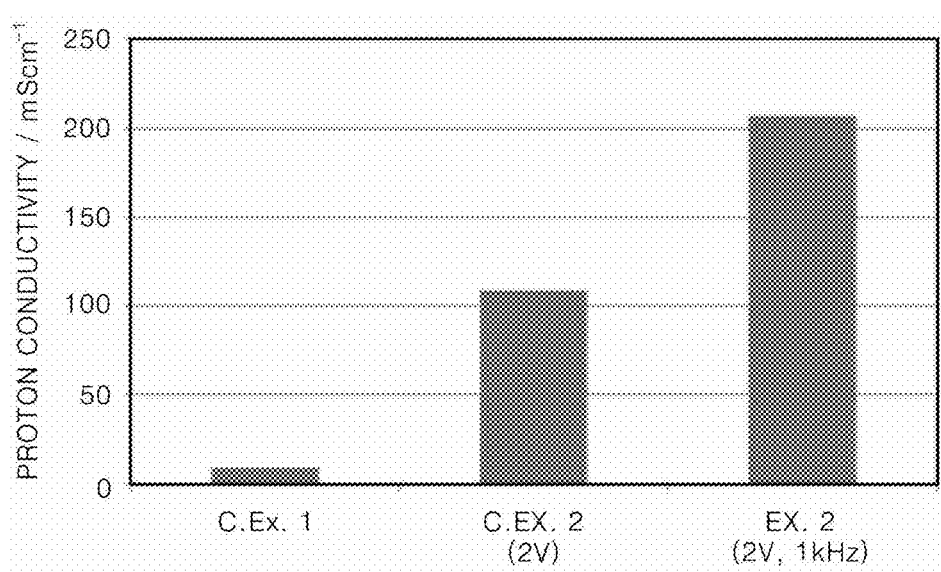
FIG. 10 is a diagram showing proton conductivity values for an ion exchange membrane in Example 2 and Comparative Examples 1 and 2 according to another embodiment of the disclosure.

FIG. 10 is a diagram showing the proton conductivity values for the ion exchange membranes in Example 2 and Comparative Examples 1 and 2 according to another embodiment of the disclosure. Referring to FIG. 10, it can be seen that the proton conductivity of the ion exchange membrane in Comparative Example 2 prepared in DC electric field to which the voltage of 2 V was applied become increased compared to that of Comparative Example 1 prepared without applying a voltage. Further, the ion exchange membrane in Example 2 prepared under the AC electric field to which the voltage of 2 V and the AC frequency of 1 kHz were applied exhibits the proton conductivity of 207.3 mS/cm, which is significantly improved compared to the proton conductivity of the ion exchange membrane in Comparative Example 2 prepared in the DC electric field. As such, the method for fabricating an ion exchange membrane using an AC frequency according to the present disclosure can improve the ionic conductivity compared to the ion exchange membrane prepared under a conventional DC electric field, which can therefore be affirmatively utilized in the relevant art.

Test Example 7: Analysis of the Cell Performance of the Ion Exchange Membrane Using a Reverse Electrodialysis System The ion exchange membranes prepared in Example 2 and Comparative Examples 1 and 2 were applied to a reverse electrodialysis unit cells to compare/analyze their performances to each other. The maximum power density of the reverse electrodialysis was determined by a stack resistance. The stack resistance constitutes a large portion of the resistance of the ion exchange membrane. In this regard, since the higher the proton conductivity, the resistance of the ion exchange becomes lower, a higher maximum power density can be expected in a system using an ion exchange membrane having higher proton conductivity.

Specifically, the reverse electrodialysis system comprised two sheets of an anion exchange membrane (AMX, ASTOM) and one sheet of cation exchange membrane (one selected from the cation exchange membranes prepared in Example 1 and Comparative Examples 1 and 2). The effective surface area of the ion exchange membrane was 2 cm×10 cm, soft PVC having a thickness of 280 μm was used as a gasket mounted on the stack, and a separator having a thickness of 80 μm was installed between the ion exchange membranes. The solution made from 35 g/L NaCl was flowed into a concentration bath at a flow rate of 10 mL/min, and the solution made from 1 g/L NaCl was introduced into a dilution bath at a flow rate of 10 mL/min. A carbon fiber having 2 cm×10 cm size was used as an electrode, and the solution made from 70 g/L NaCl, 50 mM $Fe(SO_3)$ and 50 mM $Fe_2(SO_3)_3$ was circulated at a flow rate of 300 mL/min in an electrode bath. While measuring the voltage at the current of 0 A for 3 minutes to check the performance of the reverse electrodialysis, the varied current densities were calculated while falling the current level to −1 mA, −2 mA, . . . , −60 mA (stepwise in 1 mA increments).

Figure 11:
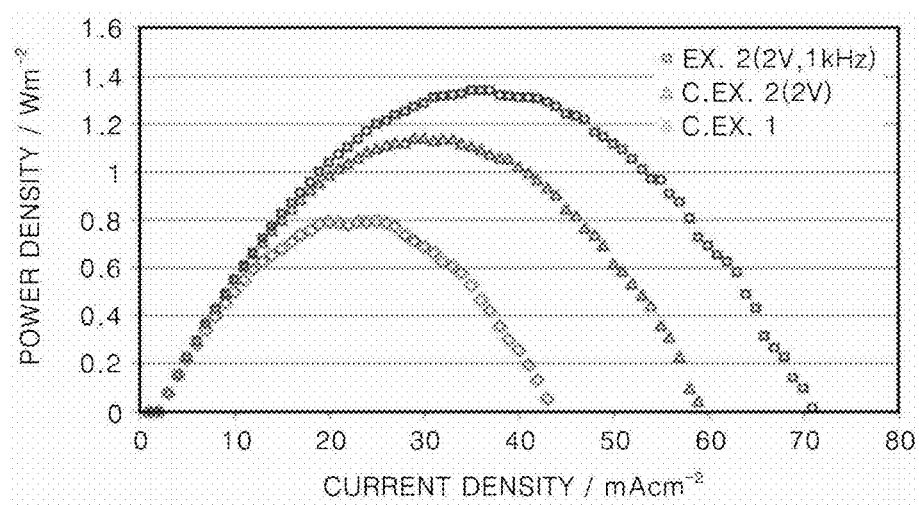
FIG. 11 is a diagram showing the performance of a reverse electrodialysis unit cell equipped with an ion exchange membrane in Example 2 and Comparative Examples 1 and 2 according to another embodiment of the disclosure.

FIG. 11 is a diagram showing the performance of the reverse electrodialysis unit cell equipped with the ion exchange membrane prepared in Example 2 and Comparative Examples 1 and 2 according to another embodiment of the present disclosure. The results are listed in Table 5 below.

TABLE 5

| Type of ion exchange membrane | Maximum power density |
|---|---|
| C. Ex. 1 | 0.79 W/m$^2$ |
| C. Ex. 2 | 1.14 W/m$^2$ |
| Ex. 2 | 1.34 W/m$^2$ |

Referring to FIG. 11 and Table 5, the ion exchange membrane in Comparative Example 1 prepared without electric field has 0.79 W/m$^2$, while the ion exchange membranes in Comparative Example 2 and Example 2 under the applied electric field have 1.14 W/m$^2$ and 1.34 W/m$^2$, respectively, which confirmed us that the ion exchange membrane prepared under electric field had significantly improved performance over the ion exchange membrane in Comparative Example prepared without electric field. That is, it can be seen that the ion exchange membrane having an electrical alignment has a better performance Additionally, The ion exchange membrane in Example 2 prepared under the AC electric field according to the present disclosure have shown a better performance than the ion exchange membrane in Comparative Example 2 prepared under the DC electric field, which confirmed us that the technique of aligning the ion channels using the AC electric field according to the present disclosure is highly effective.

While the invention has been particularly shown and described with reference to exemplary embodiments and drawings thereof, it will be understood by those skilled in the art that various modifications or changes in form and details may be made thereto without departing from the spirit and scope of the invention as defined by the appended claims.

What is claimed is:

1. A device for fabricating an ion exchange membrane, comprising:
    a substrate on which a polymer solution is placed;
    a doctor blade which is arranged spaced apart from the substrate, and is in contact with the polymer solution to transfer the same to both ends of the substrate to perform a casting process; and
    a function generator which is electrically connected to the substrate and the doctor blade to give an AC voltage and an AC frequency.

2. The device of claim 1, wherein the substrate and the doctor blade are formed of at least one material selected from the group consisting of stainless steel, aluminum (Al), iron (Fe), brass, and copper (Cu).

3. The device of claim 1, wherein the doctor blade transfers the polymer solution at a rate of 5 to 7 mm/min toward one of both ends of the substrate.

4. The device of claim 1, wherein while casting the polymer solution, the AC voltage and AC frequency are applied to the substrate and the doctor blade.

5. The device of claim 1, further comprising an oscilloscope connected to the substrate and the doctor blade for measuring a change in voltages applied to the substrate and the doctor blade.

6. A method for fabricating an ion exchange membrane using the device according to claim 1, comprising:
    placing the polymer solution on the substrate; and
    forming the ion exchange membrane by performing a casting process with the polymer solution using the device,
    wherein an AC electric field is applied to the polymer solution while performing the casting process.

7. The method of claim 6, wherein the polymer solution comprises:
    at least one ion conductive polymer selected from the group consisting of a hydrocarbon-based polymer, a fluorine-based polymer, a partially fluorine-based polymer, and an aliphatic hydrocarbon-based polymer; and
    an organic solvent.

8. The method of claim 6, wherein the polymer solution comprises a sulfonated poly(2,6-dimethyl-1,4-phenylene oxide) (SPPO) and a solvent.

9. The method of claim 6, wherein in the step of forming the ion exchange membrane, 1 to 2 V of AC voltage is applied to the substrate and the doctor blade.

10. The method of claim 6, wherein in the step of forming the ion exchange membrane, 10 to 100 kHz of AC frequency is applied to the substrate and the doctor blade.

11. The method of claim 6, wherein the ion exchange membrane has an aligned structure of ion channels from the applied AC electric field.

* * * * *